US012685244B2

(12) United States Patent
Jeong et al.

(10) Patent No.: US 12,685,244 B2
(45) Date of Patent: Jul. 21, 2026

(54) APPARATUS AND METHOD FOR PROVIDING WIDE-AREA PRECISION AGRICULTURE SERVICE BASED ON COLLABORATION BETWEEN HETEROGENEOUS DRONES

(71) Applicant: ELECTRONICS AND TELECOMMUNICATIONS RESEARCH INSTITUTE, Daejeon (KR)

(72) Inventors: Yang-Jae Jeong, Incheon (KR); Kyung-Il Kim, Daejeon (KR); Chae-Deok Lim, Daejeon (KR); Beob-Kyun Kim, Jeonju-si (KR); Young-Bin Kim, Daejeon (KR); Jin-Ah Shin, Daejeon (KR); Duk-Kyun Woo, Daejeon (KR); Dong-Wan Ryoo, Daejeon (KR); Yoo-Jin Lim, Sejong-si (KR); Su-Jung Ha, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 816 days.

(21) Appl. No.: 17/975,996

(22) Filed: Oct. 28, 2022

(65) Prior Publication Data

US 2023/0165182 A1 Jun. 1, 2023

(30) Foreign Application Priority Data

Nov. 29, 2021 (KR) ........................ 10-2021-0166757

(51) Int. Cl.
| | |
|---|---|
| *A01B 79/00* | (2006.01) |
| *A01C 21/00* | (2006.01) |

(Continued)

(52) U.S. Cl.
CPC .......... *A01B 79/005* (2013.01); *A01C 21/005* (2013.01); *B64U 10/25* (2023.01); *B64U 2101/30* (2023.01); *B64U 2201/10* (2023.01)

(58) Field of Classification Search
CPC .......................... A01B 79/005; A01C 21/005; B64U 2201/10; B64U 2101/30; B64U 10/25
See application file for complete search history.

(56) References Cited

U.S. PATENT DOCUMENTS 11,570,946 B2 * 2/2023 Winarski ............. A01C 21/005
2021/0078706 A1 3/2021 Lin et al.
(Continued)

FOREIGN PATENT DOCUMENTS

KR 10-2020-0043938 4/2020
KR 10-2020-0143159 12/2020
(Continued)

OTHER PUBLICATIONS

Kim So-yoon, "Fourth Industrial Revolution Drones] Rural areas with fewer worries about labor through drones," Daily Bizon, Jul. 16, 2020.

*Primary Examiner* — Elias Desta

(74) *Attorney, Agent, or Firm* — KILE PARK REED & HOUTTEMAN PLLC

(57) ABSTRACT

Disclosed herein are an apparatus and method for providing a wide-area precision agriculture service based on collaboration between heterogeneous drones. The method for providing a wide-area precision agriculture service based on collaboration between heterogeneous drones includes transferring first mission information including photography of an entirety of arable land to a fixed-wing drone, receiving first drone data corresponding to the first mission information from the fixed-wing drone, and analyzing the entire agricultural arable land based on the first drone data, and transferring detailed mission information generated based (Continued)

on a result of analysis of the entire agricultural arable land
to at least one rotary-wing drone.

16 Claims, 5 Drawing Sheets

(51) Int. Cl.
  *B64U 10/25*     (2023.01)
  *B64U 101/30*    (2023.01)

(56)                    References Cited

U.S. PATENT DOCUMENTS

2021/0217148 A1     7/2021  Sauder et al.
2022/0172467 A1*    6/2022  Verma ................... G06V 20/194
2023/0177968 A1*    6/2023  Arksey ..................... G06T 7/73
                                                              701/120

FOREIGN PATENT DOCUMENTS

KR          10-2193844        12/2020
KR          10-2200314         1/2021
KR      10-2021-0029868        3/2021
KR      10-2021-0037313        4/2021
KR          10-2317408        10/2021

* cited by examiner

Figure 6:
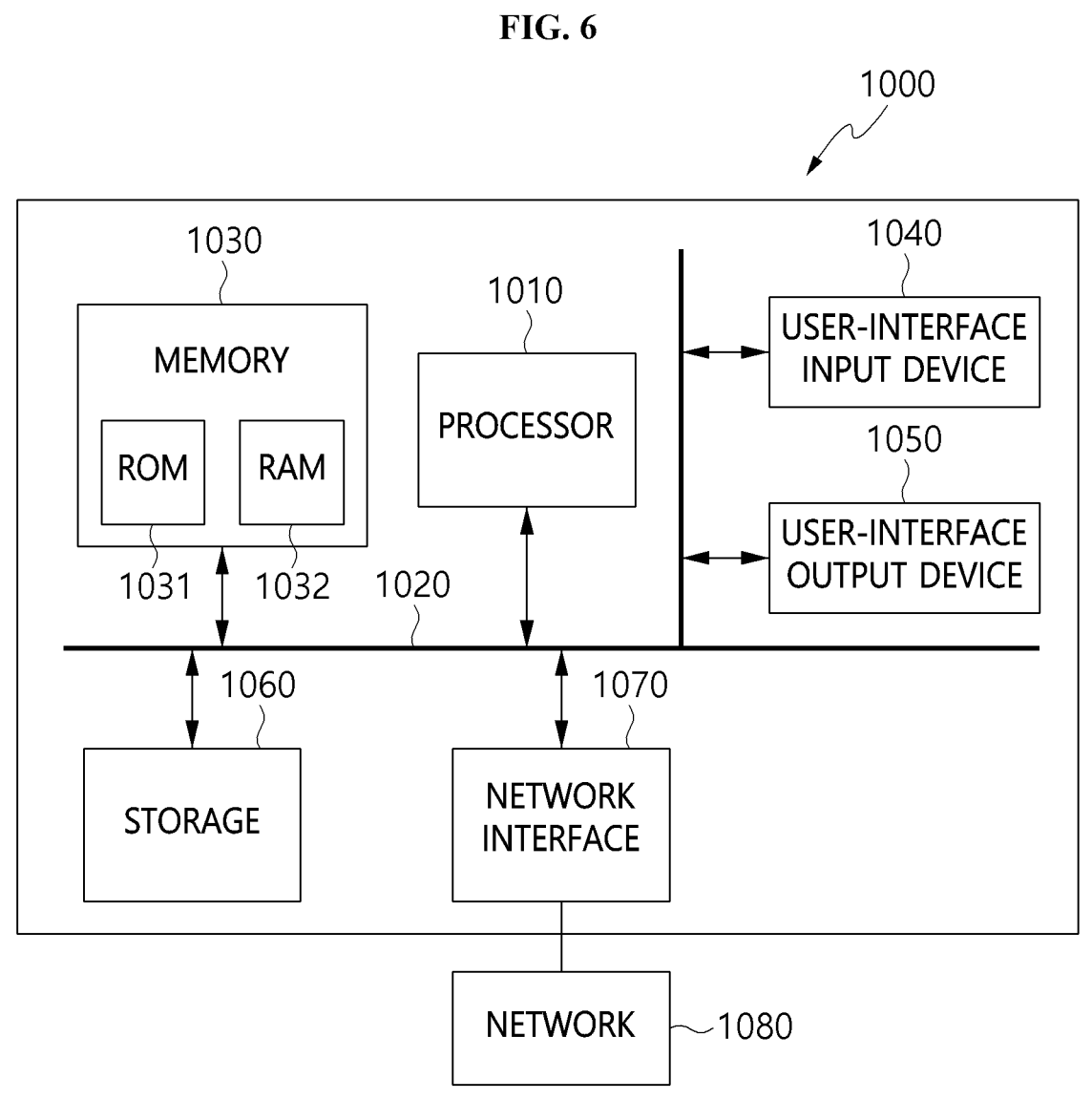

MEMORY

ROM | RAM

1031 | 1032

1010

PROCESSOR

1040

USER-INTERFACE INPUT DEVICE

1050

USER-INTERFACE OUTPUT DEVICE

1020

1060

STORAGE

1070

NETWORK INTERFACE

NETWORK 1080

APPARATUS AND METHOD FOR PROVIDING WIDE-AREA PRECISION AGRICULTURE SERVICE BASED ON COLLABORATION BETWEEN HETEROGENEOUS DRONES

CROSS REFERENCE TO RELATED APPLICATION

This application claims the benefit of Korean Patent Application No. 10-2021-0166757, filed Nov. 29, 2021, which is hereby incorporated by reference in its entirety into this application.

BACKGROUND OF THE INVENTION

1. Technical Field

The following embodiments relate to precision agriculture technology using drones.

2. Description of the Related Art

Due to changes in social and natural environments, agriculture is faced with new challenges. These are related to labor shortages attributable to the aging of agricultural workers and reduction in rural populations, destruction of the natural environment and deterioration of soil caused by chemical fertilizers and agricultural machines that have been used to improve productivity, and need for scale economies and agriculture specialization to improve price competitiveness and quality in the age of limitless competition. Further, recently, there may occur the case in which the growing condition for crops is completely and newly changed due to unexpected climate changes.

In preparation for such challenges, effort to simultaneously realize environment-friendly cultivation and economic effectiveness through precision agriculture, which combines information and communications technology (ICT) with agriculture, including a method of utilizing drones for agriculture to extend or maintain agricultural output, has been attempted.

However, this method is effective in a limited area, but it is difficult to apply the method to a wide area. For example, because drones can fly for only 20 to 30 minutes on average due to the limited battery capacity thereof, the drones cannot fly over a wide area. Further, even if multiple drones are used together, the usage of multiple drones may be unnecessarily wasted unless the drones are efficiently utilized to cover required areas, thus making it difficult to actually apply the drones to agriculture.

Further, for precision agriculture, situation analysis through data acquisition is important. Recently, data acquisition and analysis has been conducted using Internet-of-Things (IoT) equipment, artificial satellites, drones, or the like. However, in the case of greenhouse horticultural products, image acquisition and analysis is possible using CCTVs or IoT equipment, but it is difficult to apply CCTVs or IoT equipment over a wide area. Further, although artificial satellites enable wide-area photography and are thus able to be applied to wide-area precision agriculture, access to artificial satellite data is not easy, and detailed information analysis is impossible due to the low spatial resolution thereof.

Meanwhile, many precision agriculture methods using drones have been attempted. By utilizing various sensors mounted to drones, crop analysis, land analysis, moisture analysis, growth analysis, etc. may be performed, and by additionally installing instruments on the drones, sowing, application of fertilizers, pest control, etc. may be easily conducted within a short period of time. However, currently, a batch job is typically conducted over a wide area by manual controlling drones depending on the crop cultivation processes due not only to the short flight time but also to the low rate of adoption of automatic flight. In other words, drones are currently being used for convenience improvement to reduce labor rather than for precision agriculture. However, because farmers must manually control drones while personally visually checking the state of the land so as to use the minimum amount of agricultural chemicals for environment-friendly cultivation, precision agriculture using drones is considered to convey hardly any advantage with regard to reduction in expenses and labor.

SUMMARY OF THE INVENTION

An embodiment is intended to enable actual precision agriculture by reducing labor and expenses through collaboration between multiple heterogeneous drones on large tracts of arable land on which various kinds of crops are simultaneously cultivated.

An embodiment is intended to enable precision agriculture to be performed with high precision through collaboration between multiple heterogeneous drones on large tracts of arable land on which various kinds of crops are simultaneously cultivated.

In accordance with an aspect, there is provided a method for providing a wide-area precision agriculture service based on collaboration between heterogeneous drones, including transferring first mission information including photo shooting mission for entire agricultural arable land to a fixed-wing drone, receiving first drone data corresponding to the first mission information from the fixed-wing drone, and analyzing the entire agricultural arable land based on the first drone data, and transferring detailed mission information generated based on a result of analysis of the entire agricultural arable land to at least one rotary-wing drone.

The first mission information may include information about a location of the entire agricultural arable land, a flight path, photo shooting plan, and information about missions for respective periods depending on lifecycles of respective crops.

Analyzing the entire agricultural arable land may include calling an Artificial Intelligence (AI) model mapped to the first mission information, and inferring a result of analysis, including a distribution of crops over the entire agricultural arable land and growth states of respective crops, from the first drone data based on the called AI model.

Transferring to the at least one rotary-wing drone may include transferring second mission information for precision monitoring of a problem region, identified based on the result of analysis of the entire agricultural arable land, to a first rotary-wing drone, and the method may further include receiving second drone data corresponding to the second mission information from the first rotary-wing drone and precisely analyzing the problem region based on the second drone data.

The first rotary-wing drone may include multiple rotary-wing drones, each mapped to a unit arable land partition on which one kind of crop is cultivated, and the second mission information may differ for each unit arable land partition.

Precisely analyzing the problem region may include calling an Artificial Intelligence (AI) model mapped to the second mission information, and inferring a result of analysis including growth states of individual crops cultivated on respective unit arable land partitions from the second drone data based on the called AI model.

The result of analysis of the entire agricultural arable land and a result of precision analysis of the problem region may be managed, together with the mission information and area location information, as topographic information, and the topographic information may be used to generate detailed mission information.

The topographic information is managed by data monitoring for systematic management of drone data acquired from the fixed-wing drone or the at least one rotary-wing drone in real time, wherein the data monitoring is the process of monitoring service information after reconstruction of one precise large-scale image from sequential capturing of real-time data with data coordination.

Transferring to the at least one rotary-wing drone may include transferring third mission information including performance of a detailed task, generated based on at least one of the result of analysis of the entire agricultural arable land or a result of precision analysis of the problem region or a combination thereof, to a second rotary-wing drone.

In accordance with another aspect, there is provided an apparatus for providing a wide-area precision agriculture service based on collaboration between heterogeneous drones, including memory for storing at least one program, and a processor for executing the program, wherein the program is configured to perform transferring first mission information including photographing of an entirety of arable land to a fixed-wing drone, receiving first drone data corresponding to the first mission information from the fixed-wing drone, and analyzing the entire agricultural arable land based on the first drone data, and transferring detailed mission information generated based on a result of analysis of the entire agricultural arable land to at least one rotary-wing drone.

The first mission information may include information about a location of the entire agricultural arable land, a flight path, and information about missions for respective periods depending on lifecycles of respective crops.

The program may be configured to perform, in analyzing the entire agricultural arable land, calling an Artificial Intelligence (AI) model mapped to the first mission information, and inferring a result of analysis, including a distribution of crops of the entire agricultural arable land and growth states of respective crops, from the first drone data based on the called AI model.

The program may be configured to perform, in transferring to the at least one rotary-wing drone, transferring second mission information for precision monitoring of a problem region, identified based on the result of analysis of the entire agricultural arable land, to a first rotary-wing drone, and the program may be configured to further perform receiving second drone data corresponding to the second mission information from the first rotary-wing drone and precisely analyzing the problem region based on the second drone data.

The first rotary-wing drone may include multiple rotary-wing drones, each mapped to a unit arable land partition on which one kind of crop is cultivated, and the second mission information may differ for each unit arable land partition.

The program may be configured to perform, in precisely analyzing the problem region, calling an Artificial Intelligence (AI) model mapped to the second mission information, and inferring a result of analysis including growth states of individual crops cultivated on respective unit arable land partitions from the second drone data based on the called AI model.

The program may be configured to manage the result of analysis of the entire agricultural arable land and a result of precision analysis of the problem region, together with the mission information and area location information, as topographic information, and the topographic information may be used to generate detailed mission information.

The program may be configured to perform, in transferring to the at least one rotary-wing drone, transferring third mission information including performance of a detailed task, generated based on at least one of the result of analysis of the entire agricultural arable land or a result of precision analysis of the problem region or a combination thereof, to a second rotary-wing drone.

In accordance with a further aspect, there is provided a method for providing a wide-area precision agriculture service based on collaboration between heterogeneous drones, including transferring first mission information including photo shooting mission for the entire agriculture arable land to a fixed-wing drone, receiving first drone data corresponding to the first mission information from the fixed-wing drone, and analyzing the entire agricultural arable land based on the first drone data, transferring second mission information for precision monitoring of a problem region identified based on a result of analysis of the entire agricultural arable land to a first rotary-wing drone, receiving second drone data corresponding to the second mission information from the first rotary-wing drone, and precisely analyzing the problem region based on the second drone data, and transferring third mission information including performance of a detailed task, generated based on at least one of the result of analysis of the entire agricultural arable land or a result of precision analysis of the problem region, or a combination thereof, to a second rotary-wing drone.

Analyzing the entire agricultural arable land may include calling an Artificial Intelligence (AI) model mapped to the first mission information, and inferring a result of analysis, including a distribution of crops over the entire agricultural arable land and growth states of respective crops, from the first drone data based on the called AI model.

Precisely analyzing the problem region may include calling an Artificial Intelligence (AI) model mapped to the second mission information, and inferring a result of analysis including growth states of individual crops cultivated on respective unit arable land partitions from the second drone data based on the called AI model.

The result of analysis of the entire agricultural arable land and a result of precision analysis of the problem region may be managed, together with the mission information and area location information, as topographic information, and the topographic information may be used to generate detailed mission information.

BRIEF DESCRIPTION OF THE DRAWINGS

The above and other objects, features and advantages of the present invention will be more clearly understood from the following detailed description taken in conjunction with the accompanying drawings, in which:

FIG. 6 is a diagram illustrating the configuration of a computer system according to an embodiment.

DESCRIPTION OF THE PREFERRED EMBODIMENTS

Figure 1:
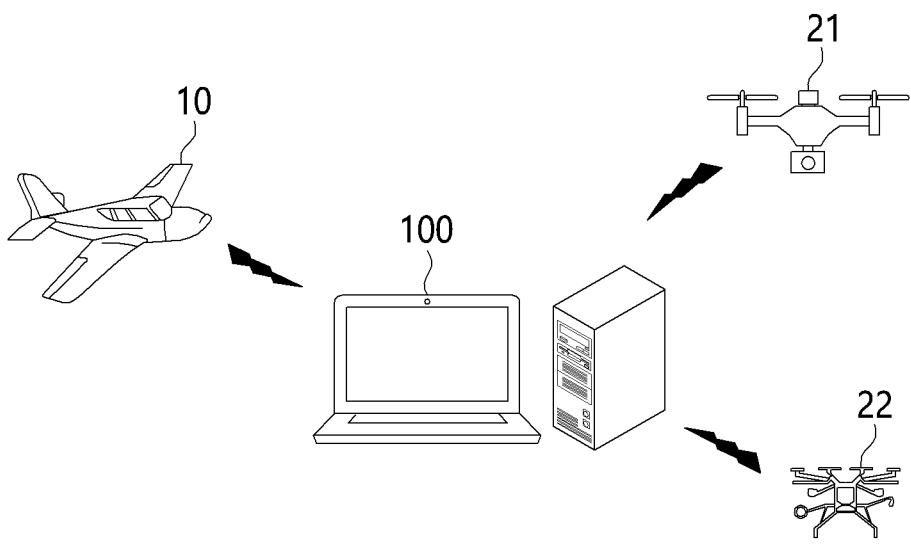
FIG. 1 is a schematic configuration diagram of a system for providing a wide-area precision agriculture service based on collaboration between heterogeneous drones according to an embodiment.

Advantages and features of the present invention and methods for achieving the same will be clarified with reference to embodiments described later in detail together with the accompanying drawings. However, the present invention is capable of being implemented in various forms, and is not limited to the embodiments described later, and these embodiments are provided so that this invention will be thorough and complete and will fully convey the scope of the present invention to those skilled in the art. The present invention should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present invention.

The terms used in the present specification are merely used to describe embodiments, and are not intended to limit the present invention. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present invention pertains. Further, terms defined in generally used dictionaries are not to be interpreted as having ideal or excessively formal meanings unless they are definitely defined in the present specification.

Hereinafter, an apparatus and method for providing a wide-area precision agriculture service based on collaboration between heterogeneous drones according to embodiments will be described in detail with reference to FIGS. 1 to 6.

In the past, methods of producing and utilizing drones having various functions based on rotary-wing drones were presented in order to realize precision agriculture. For example, such methods are implemented in such a way as to add and use various instruments specialized for agriculture work or to attach and use various sensors such as multispectral sensors so as to acquire information about environments and crops. However, it is difficult to apply precision agriculture to large tracts of arable land on which various crops are cultivated using only a single type of specialized drone. Although the advantages of precision agriculture are well known, cost-effective methods for actually performing precision agriculture are important.

Therefore, in an embodiment, there are proposed an apparatus and method for providing a wide-area precision agriculture service based on collaboration between heterogeneous drones, which use a fixed-wing drone capable of flying over a wide area and a rotary-wing drone capable of close-up photography and performing various missions, utilize a communication module included in each drone to construct a real-time communication environment between the drones and a server, and sequentially apply processes, such as acquisition and analysis of drone data, identification of a problem region, and automatic generation of drone missions, from a wide area to a narrow area, thus effectively exploiting the drones on tracts of arable land having various areas.

Figure 2:
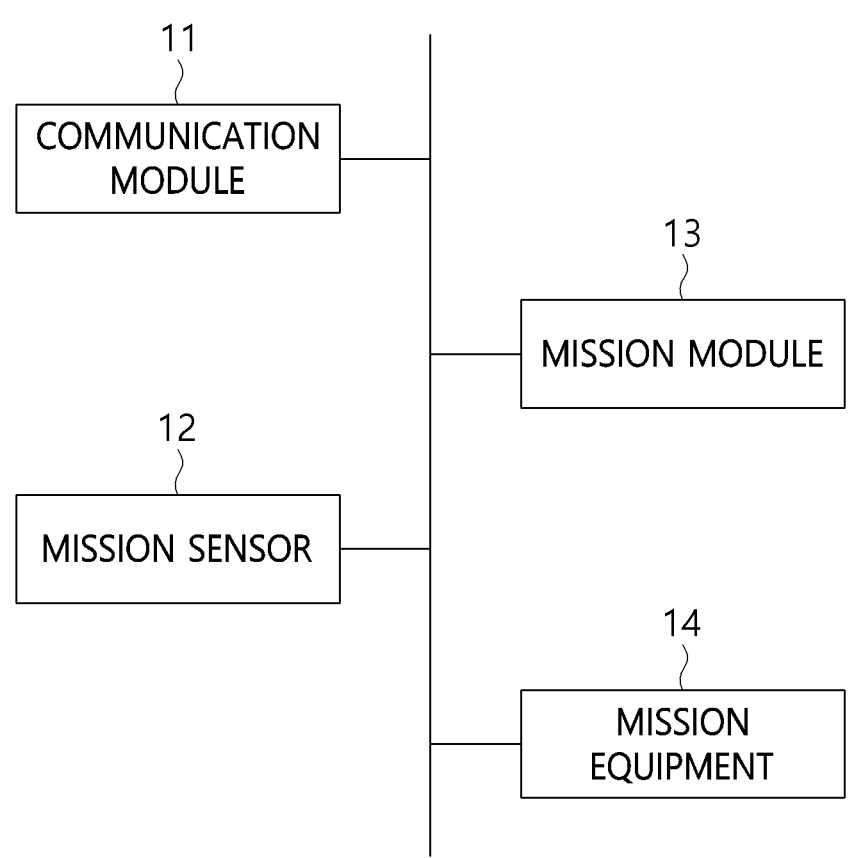
FIG. 2 is a block diagram illustrating the schematic internal configuration of a drone according to an embodiment.
Figure 3:
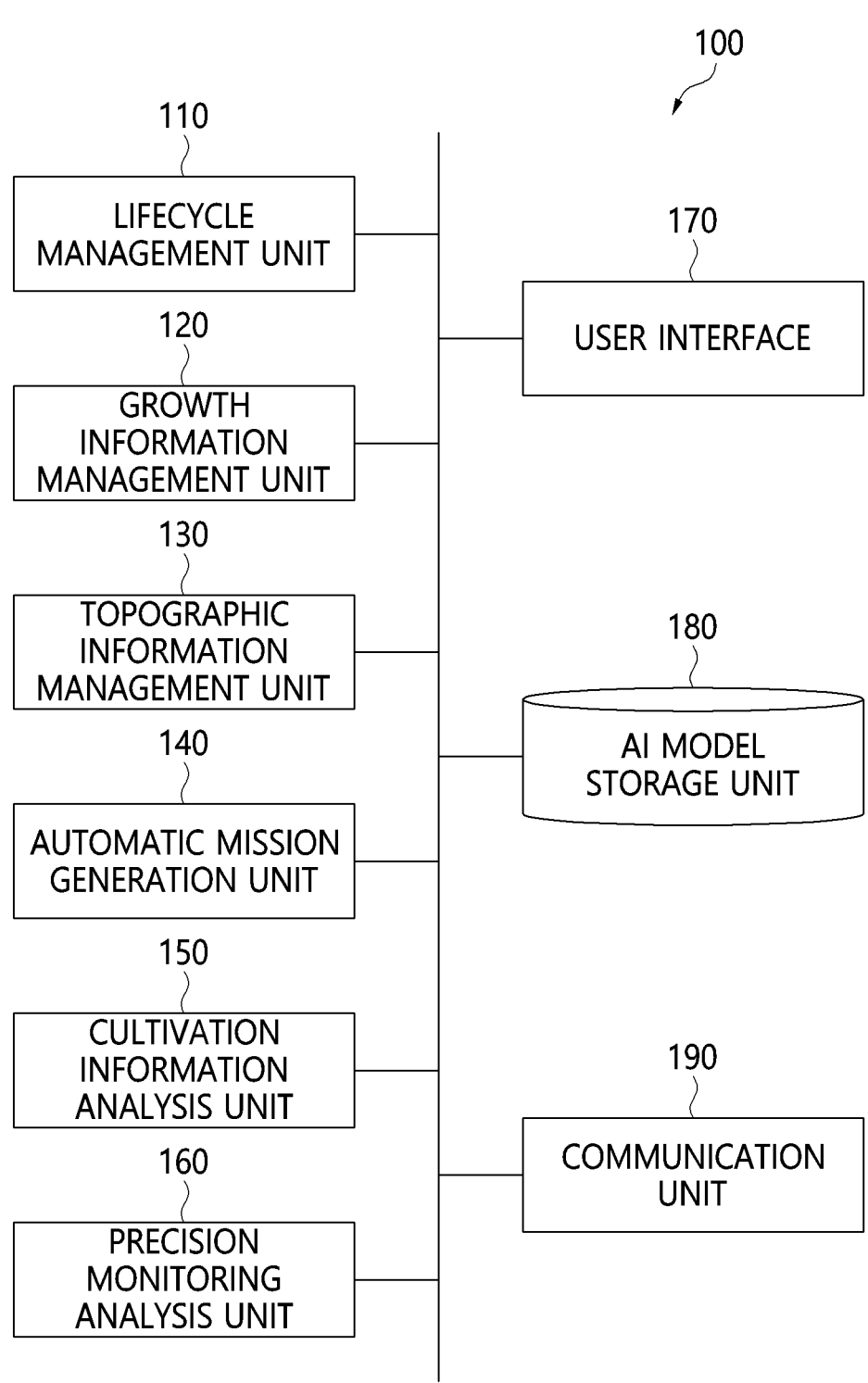
FIG. 3 is a block diagram illustrating the schematic internal configuration of a server according to an embodiment.

FIG. 1 is a schematic configuration diagram of a system for providing a wide-area precision agriculture service based on collaboration between heterogeneous drones according to an embodiment, FIG. 2 is a block diagram illustrating the schematic internal configuration of a drone according to an embodiment, and FIG. 3 is a block diagram illustrating the schematic internal configuration of a server according to an embodiment.

Referring to FIG. 1, the system for providing a wide-area precision agriculture service based on collaboration between heterogeneous drones according to the embodiment is configured such that an apparatus 100 for providing a wide-area precision agriculture service based on collaboration between heterogeneous drones (hereinafter referred to as a 'server') remotely controls multiple heterogeneous drones 10, 21, and 22 through wireless communication and enables precision agriculture to be realized through collaboration between the heterogeneous drones 10, 21, and 22.

Here, the multiple drones 10, 21, and 22 may include a fixed-wing drone 10 and rotary-wing drones 21 and 22.

The fixed-wing drone 10 is capable of flying over a wide area at a high speed for a long flight time. For example, the fixed-wing drone 10 may photograph 2.5 km$^2$ of arable land within two hours.

Therefore, in accordance with an embodiment, the fixed-wing drone 10 may be used to acquire first drone data corresponding to first mission information including photo shooting mission for the entire agriculture arable land.

Meanwhile, the rotary-wing drones 21 and 22 may perform low-altitude flight and various precision tasks.

Therefore, in accordance with an embodiment, the first rotary-wing drone 21 may be used to acquire second drone data corresponding to second mission information for precision monitoring of a problem region identified based on the results of analysis of the entirety of arable land.

Here, the first rotary-wing drone 21 may include multiple rotary-wing drones, each of which is mapped to a unit arable land partition on which one kind of crop is cultivated, and pieces of second mission information may be different from each other for respective unit arable land partitions.

Further, in an embodiment, the second rotary-wing drone 22 may be used to perform a task corresponding to third mission information including the performance of a detailed task, based on the result of analysis of the entirety of arable land, or the result of precision analysis of a problem region, or a combination thereof. For example, the second rotary-wing drone 22 may include a pest control drone, a sowing drone, a monitoring drone, etc.

Referring to FIG. 2, each of the above-described drones 10, 21, and 22 for performing missions according to the embodiment may include a communication module 11 and a mission sensor 12. In addition, the second rotary-wing drone 22 may include at least one of a mission module 13 or mission equipment 14, or a combination thereof.

The communication module 11 may receive mission information from the server 100 and transmit, in real time, drone data corresponding to the mission information to the server 100 by performing a mobile communication function using, for example, Wi-Fi, Long-Term Evolution (LTE), or Fifth Generation (5G).

Here, the drone data includes captured images, drone location information, and photographing area location, and may be transferred online to the server 100 in real time through the communication module 11, or may be transferred offline to the server 100 through a storage medium.

The mission sensor 12 may include a multispectral sensor for acquiring multispectral wavelengths including, for example, RGB, near-infrared (NIR) or RedEdge.

The mission module 13 and the mission equipment 14 may be equipment for performing a task corresponding to the third mission information. For example, equipment or the like for sowing may be included in the mission module 13 and the mission equipment 14.

Referring to FIG. 3, the server 100 may include a lifecycle management unit 110, a growth information management unit 120, a topographic information management unit 130, an automatic mission generation unit 140, a cultivation information analysis unit 150, a precision monitoring analysis unit 160, a user interface 170, an Artificial Intelligence (AI) model storage unit 180, and a communication unit 190.

The lifecycle management unit 110 stores information about the growth cycle of each of various crops cultivated on the entire agricultural arable land, and then manages lifecycle process information for each crop.

Here, because the times (i.e., periods) during which respective crops are actually cultivated are different from each other depending on the lifecycles of the respective crops, growth cycles may be managed based on time, including dates. Here, details of the lifecycles of respective crops are included in the growth information management unit 120, and thus the lifecycle management unit 110 may manage the growth cycles and detailed growth information of respective crops in association with the growth information management unit 120.

The growth information management unit 120 manages detailed information about a growth process included in the lifecycle of each of the crops. That is, the growth information management unit 120 manages information about actual tasks to be performed based on detailed information about each of the crops. Here, the growth information may include crop information such as sowing, planting, and pest information, and environmental information such as weather conditions for respective periods.

The topographic information management unit 130 manages flight information, mission information, analysis results, etc. depending on a specific location, based on the topographic information of the arable land, as location-based service information. For example, such location-based service information may be registered and managed in the form of (location information, mission content) or (location information, analysis results).

The topographic information management unit 130 initially stores only the location-based service information related to the entire agricultural arable land, but the results of analyzing the entire agricultural arable land using the fixed-wing drone 10 may be added, together with the location information, to the topographic information management unit 130. The results of analyzing the entire agricultural arable land, which are applied to the topographic information management unit 130, may be used to generate mission information of the rotary-wing drones 21 and 22.

Furthermore, the results of precisely analyzing the problem region using the first rotary-wing drone 21 may be added, together with location information, to the topographic information management unit 130. The results of precisely analyzing the problem region, which are added to the topographic information management unit 130, may be used to generate mission information of the second rotary-wing drone 22.

The topographic information is managed by data monitoring for systematic management of drone data acquired from the fixed-wing drone or the at least one rotary-wing drone in real time. Here, the data monitoring is the process of monitoring service information (management information, etc) after reconstruction of one precise large-scale image from sequential capturing of real-time data (image, etc) with data coordination.

Also, information that has been completely used by the topographic information management unit 130 may be stored as a separate history and may also be used as subsequent reference data.

The AI model storage unit 180 manages an AI model list for analyzing the entire target area and an AI model list for analyzing growth periods/states of respective crops. Here, identification information may be assigned to each of the registered AI models, thus enabling respective AI models to be distinguished from each other and used when drone missions are defined and AI analysis is performed.

The automatic mission generation unit 140 automatically generates information about missions to be performed by the fixed-wing drone 10 and the rotary-wing drones 21 and 22, respectively. Here, the automatic mission generation unit 140 may generate the mission information based on the information managed by the lifecycle management unit 110, the growth information management unit 120, and the topographic information management unit 130.

Here, the automatic mission generation unit 140 may also generate the mission information based on information input from the user through the user interface 170.

The mission information may include at least one of flight information, detailed missions, an acquired data type, an analysis AI model, inference result content, or related growth information, or a combination thereof.

First, the automatic mission generation unit 140 may generate first mission information including photo shooting plan for the entire agriculture arable land, and may transfer the generated first mission information to the fixed-wing drone 10 through the communication unit 190.

The first mission information may include the location information of the entire agricultural arable land, a flight path, photo shooting plan and information about missions for respective periods depending on the lifecycles of respective crops. In addition, the first mission information may further include the type of data to be acquired, AI model information, etc.

Further, the automatic mission generation unit 140 generates second mission information for precision monitoring of a problem region identified based on the results of analysis of the entire agricultural arable land, and transfers the second mission information to the first rotary-wing drone 21.

Here, the first rotary-wing drone 21 may include multiple rotary-wing drones, each of which is mapped to a unit arable land partition on which one kind of crop is cultivated. Therefore, the automatic mission generation unit 140 may generate different types of second mission information for respective unit arable land partitions, and may transfer the different types of second mission information to the first rotary-wing drones 21 corresponding thereto.

Furthermore, the automatic mission generation unit 140 generates third mission information including the performance of a detailed task based on at least one of the results of analysis of the entire agricultural arable land or the results of precision analysis of the problem region, or a combination thereof, and transfers the generated third mission information to the second rotary-wing drone 22. That is, the automatic mission generation unit 140 generates a flight path by identifying the problem region using location-based information registered in the topographic information management unit 130, and generates a detailed task mission plan by checking additional task information depending on the results of analysis.

The cultivation information analysis unit 150 analyzes the entire agricultural arable land based on the first drone data received from the fixed-wing drone 10.

Here, the cultivation information analysis unit 150 may call the AI model mapped to the first mission information from the AI model storage unit 180 and infer the results of analysis, including the distribution of crops over the entire agricultural arable land and growth states for respective crops, from the first drone data based on the called AI model, thus identifying the problem region.

Here, the content of acquired data, the type of AI model to be used for analysis, and details of analysis results may be included in the information of the lifecycle management unit 110 and the growth information management unit 120, and the analysis results may be transferred to the topographic information management unit 130.

The following Table 1 shows an example of the results of analysis by the cultivation information analysis unit 150.

TABLE 1

| Analysis results | Definition and usage |
| --- | --- |
| Crop classification level | Divide respective cultivation areas for crops cultivated on arable land, and determine cultivation areas or the like for respective crops. |
| Planting distribution | Check whether crops are transplanted on empty land and arable land and are being cultivated thereon. |
| Growth abnormality level | Determine whether growth states of respective crops are normal or abnormal. |
| Harvest distribution | Check cultivation processes and current states of respective crops and predict future yields of respective crops |

The precision monitoring analysis unit 160 precisely analyzes the problem region based on second drone data received from the first rotary-wing drone 21. For example, accurate ecological information, pest information, etc. of individual crops may be analyzed.

Here, when the problem region is precisely analyzed, the precision monitoring analysis unit 160 may call an AI model mapped to the second mission information from the AI model storage unit 180 and may infer analysis results including the growth states of individual crops cultivated on unit arable land partitions from the second drone data based on the called AI model.

Here, the content of acquired data, the type of AI model to be used for analysis, and the details of analysis results may be included in the information of the lifecycle management unit 110 and the growth information management unit 120, and the analysis results may be transferred to the topographic information management unit 130.

Figure 4:
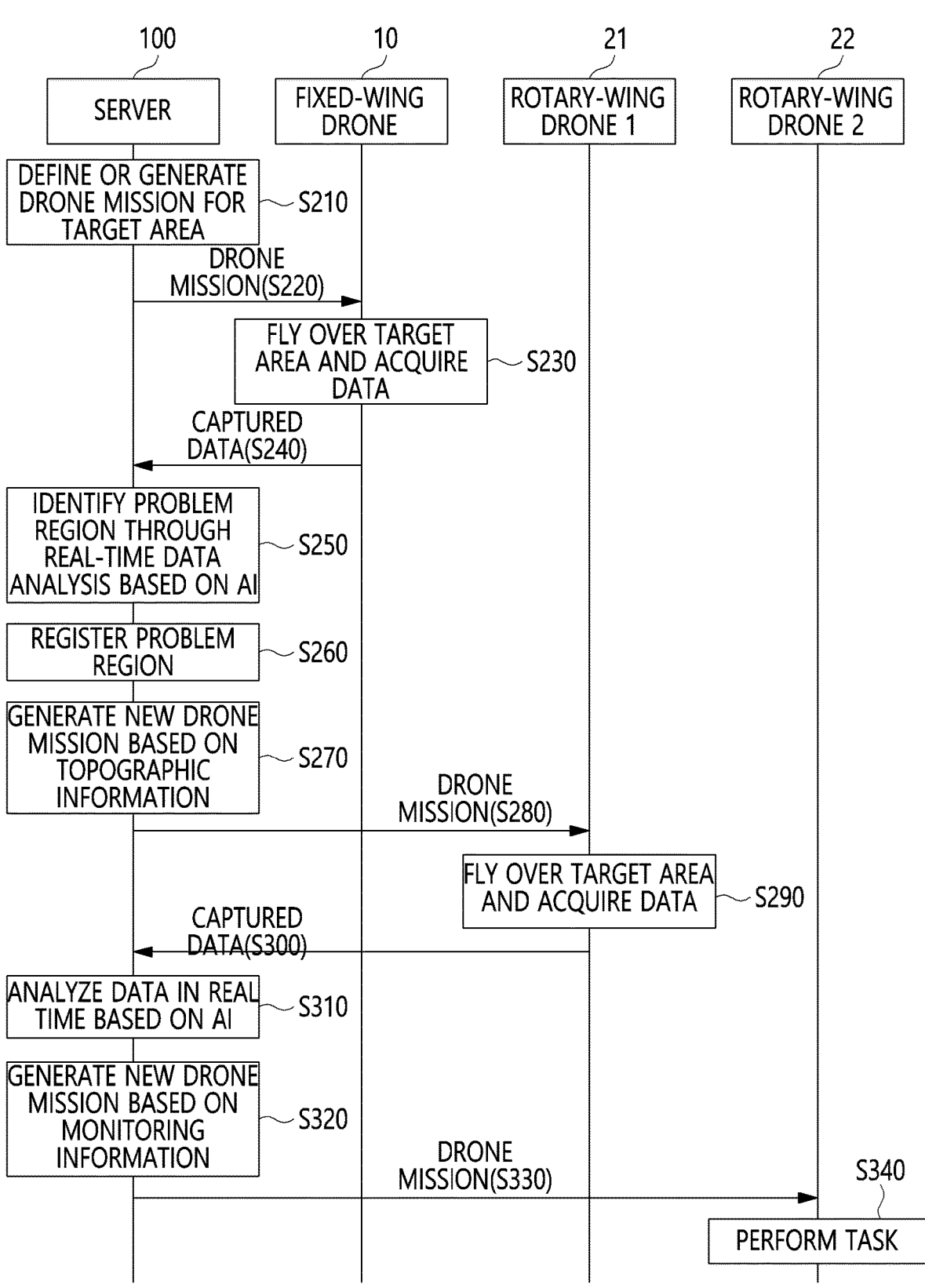
FIG. 4 is a signal flowchart for explaining a method for providing a wide-area precision agriculture service based on collaboration between heterogeneous drones according to an embodiment.
Figure 5:
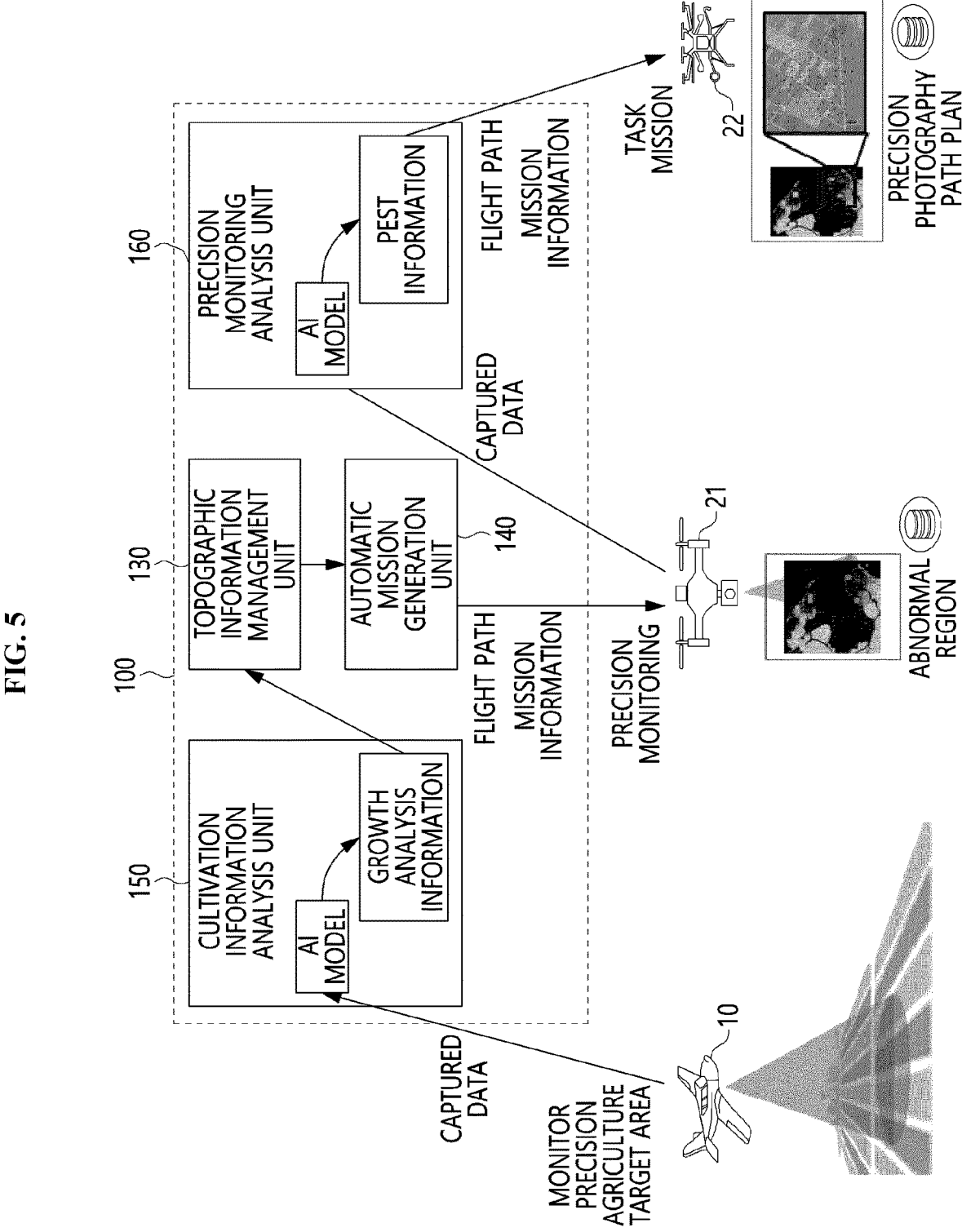
FIG. 5 is a diagram for explaining an example of the operation of an apparatus for providing a wide-area precision agriculture service based on collaboration between heterogeneous drones according to an embodiment.

FIG. 4 is a signal flowchart for explaining a method for providing a wide-area precision agriculture service based on collaboration between heterogeneous drones according to an embodiment, and FIG. 5 is a diagram for explaining an example of the operation of an apparatus for providing a wide-area precision agriculture service based on collaboration between heterogeneous drones according to an embodiment.

Referring to FIGS. 4 and 5, the automatic mission generation unit 140 of a server 100 generates first mission information including photography of the entire agricultural arable land at step S210, and transfers the first mission information to a fixed-wing drone 10 at step S220.

Here, the first mission information may include the location information of the entire agricultural arable land, a flight path, photo shooting plan and information about missions for respective periods depending on the lifecycles of respective crops.

Next, the fixed-wing drone 10 acquires first drone data corresponding to the first mission information at step S230. That is, referring to FIG. 5, the fixed-wing drone 10 may acquire captured data while flying over the entire agricultural arable land.

Thereafter, the fixed-wing drone 10 transfers the first drone data to the server 100 at step S240.

The cultivation information analysis unit 150 of the server 100 analyzes the entire agricultural arable land based on the first drone data at step S250.

In detail, the cultivation information analysis unit 150 may call an AI model mapped to the first mission information, and may infer the results of analysis, including the distribution of crops over the entire agricultural arable land and growth states for respective crops, from the first drone data based on the called AI model, thus identifying a problem region at step S260.

Here, the results of analysis of the entire agricultural arable land may be stored and managed, together with mission information and area location information, in the topographic information management unit 130 of the server 100. This topographic information may be used by the automatic mission generation unit 140 to generate detailed mission information.

Thereafter, the automatic mission generation unit 140 of the server 100 generates second mission information for precision monitoring of the problem region identified based on the results of analysis of the entire agricultural arable land at step S270, and transfers the generated second mission information to the first rotary-wing drone 21 at step S280.

Here, the first rotary-wing drone 21 may include multiple rotary-wing drones, each of which is mapped to a unit arable land partition on which one kind of crop is cultivated, and pieces of second mission information may be different from each other for respective unit arable land partitions.

The first rotary-wing drone 21 acquires second drone data corresponding to the second mission information while flying over the problem region at step S290, and transmits the second drone data to the server 100 at step S300.

The precision monitoring analysis unit 160 of the server 100 precisely analyzes the problem region based on the second drone data received from the first rotary-wing drone 21 at step S310.

Here, when the problem region is precisely analyzed, the precision monitoring analysis unit 160 may call an AI model mapped to the second mission information, and may infer analysis results including the growth states of individual crops cultivated on unit arable land partitions from the second drone data based on the called AI model.

The results of precision analysis of the problem region may be managed, together with the mission information and area location information, as topographic information. This topographic information may be used to generate detailed mission information.

Then, the server 100 generates third mission information including performance of a detailed task based on at least one of the results of analysis of the entire agricultural arable land or the results of precision analysis of the problem region, which are managed as the topographic information, or a combination thereof at step S320, and transfers the generated third mission information to a second rotary-wing drone 22 at step S330.

Thereafter, the second rotary-wing drone 22 performs a task corresponding to the third mission information at step S340.

FIG. 6 is a diagram illustrating the configuration of a computer system according to an embodiment.

An apparatus for providing a wide-area precision agriculture service based on collaboration between heterogeneous drones according to an embodiment may be implemented in a computer system 100 such as a computer-readable storage medium.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semi-conductor device for executing programs or processing instructions stored in the memory 1030 or the storage 1060. Each of the memory 1030 and the storage 1060 may be a storage medium including at least one of a volatile medium, a nonvolatile medium, a removable medium, a non-removable medium, a communication medium, and an information delivery medium. For example, the memory 1030 may include Read-Only Memory (ROM) 1031 or Random Access Memory (RAM) 1032.

In accordance with the described embodiments, the present invention may accurately identify a region requiring a task based on an AI model by subdividing a target area from a wide area to a narrow area in a top-down manner through collaboration between multiple heterogeneous drones on wide-area arable land on which various crops are simultaneously cultivated, and may reduce labor and expenses by performing only required tasks, thus enabling environment-friendly precision agriculture such as the use of a minimum amount of fertilizers and agricultural chemicals.

Although the embodiments of the present invention have been disclosed with reference to the attached drawing, those skilled in the art will appreciate that the present invention can be implemented in other concrete forms, without changing the technical spirit or essential features of the invention. Therefore, it should be understood that the foregoing embodiments are merely exemplary, rather than restrictive, in all aspects.

What is claimed is:

1. A method for providing a service based on collaboration between heterogeneous devices, comprising:

collecting data captured or generated by the heterogeneous devices which form a distributed system across multiple locations; and performing processing and management activities conducted on the data including at least one of data monitoring, analysis, and combination to produce an output for the service, wherein the data monitoring is the process of monitoring service information after reconstruction of one precise large-scale image from sequential capturing of real-time data with data coordination, wherein the devices include a fixed-wing drone and at least one rotary-wing drone, and wherein the method further comprises:

transferring first mission information including photo shooting mission for the entire agriculture arable land to a fixed-wing drone;

receiving first drone data corresponding to the first mission information from the fixed-wing drone, and analyzing the entire agricultural arable land based on the first drone data; and transferring detailed mission information generated based on a result of analysis of the entire agricultural arable land to at least one rotary-wing drone.

2. The method of claim 1, wherein the first mission information includes information about a location of the entire agricultural arable land, a flight path, photo shooting plan and information about missions for respective periods depending on lifecycles of respective crops, wherein analyzing the entire agricultural arable land comprises:

calling an Artificial Intelligence (AI) model mapped to the first mission information; and inferring a result of analysis, including a distribution of crops over the entire agricultural arable land and growth states of respective crops, from the first drone data based on the called AI model.

3. The method of claim 1, wherein:

transferring to the at least one rotary-wing drone comprises:

transferring second mission information for precision monitoring of a problem region, identified based on the result of analysis of the entire agricultural arable land, to a first rotary-wing drone, and the method further comprises:

receiving second drone data corresponding to the second mission information from the first rotary-wing drone and precisely analyzing the problem region based on the second drone data.

4. The method of claim 3, wherein:

the first rotary-wing drone comprises multiple rotary-wing drones, each mapped to a unit arable land partition on which one kind of crop is cultivated, and the second mission information differs for each unit arable land partition.

5. The method of claim 3, wherein precisely analyzing the problem region comprises:

calling an Artificial Intelligence (AI) model mapped to the second mission information; and inferring a result of analysis including growth states of individual crops cultivated on respective unit arable land partitions from the second drone data based on the called AI model.

6. The method of claim 3, wherein:

the result of analysis of the entire agricultural arable land and a result of precision analysis of the problem region are managed, together with the mission information and area location information, as topographic information, and the topographic information is used to generate detailed mission information.

7. The method of claim 3, wherein transferring to the at least one rotary-wing drone comprises:

transferring third mission information including performance of a detailed task, generated based on at least one of the result of analysis of the entire agricultural arable land or a result of precision analysis of the problem region or a combination thereof, to a second rotary-wing drone.

8. The method of claim 1, wherein the service information is managed by the data monitoring for management of data acquired from the heterogeneous devices in real time.

9. An apparatus for providing a service based on collaboration between heterogeneous devices, comprising:

a memory for storing at least one program; and a processor for executing the program, wherein the program is configured to perform:

collecting data captured or generated by the heterogeneous devices which form a distributed system across multiple locations; and performing processing and management activities conducted on the data including at least one of data monitoring, analysis, and combination to produce an output for the service, wherein the data monitoring is the process of monitoring service information after reconstruction of one precise large-scale image from sequential capturing of real-time data with data coordination, wherein the devices include a fixed-wing drone and at least one rotary-wing drone, and wherein the program is configured to perform:

transferring first mission information including photo shooting mission for the entire farmland to a fixed-wing drone, receiving first drone data corresponding to the first mission information from the fixed-wing drone, and analyzing the entire agricultural arable land based on the first drone data, and transferring detailed mission information generated based on a result of analysis of the entire agricultural arable land to at least one rotary-wing drone.

10. The apparatus of claim 9, wherein:

the first mission information includes information about a location of the entire agricultural arable land, a flight path, photo shooting plan and information about missions for respective periods depending on lifecycles of respective crops, and the program is configured to perform, in analyzing the entire agricultural arable land;

calling an Artificial Intelligence (AI) model mapped to the first mission information, and inferring a result of analysis, including a distribution of crops of the entire agricultural arable land and growth states of respective crops, from the first drone data based on the called AI model.

11. The apparatus of claim 9, wherein:

the program is configured to perform, in transferring to the at least one rotary-wing drone, transferring second mission information for precision monitoring of a problem region, identified based on the result of analysis of the entire agricultural arable land, to a first rotary-wing drone, and the program is configured to further perform, receiving second drone data corresponding to the second mission information from the first rotary-wing drone and precisely analyzing the problem region based on the second drone data.

12. The apparatus of claim 11, wherein:

the first rotary-wing drone comprises multiple rotary-wing drones, each mapped to a unit arable land partition on which one kind of crop is cultivated, and the second mission information differs for each unit arable land partition.

13. The apparatus of claim 11, wherein the program is configured to perform, in precisely analyzing the problem region:

calling an Artificial Intelligence (AI) model mapped to the second mission information, and inferring a result of analysis including growth states of individual crops cultivated on respective unit arable land partitions from the second drone data based on the called AI model.

14. The apparatus of claim 11, wherein:

the program is configured to manage the result of analysis of the entire agricultural arable land and a result of precision analysis of the problem region, together with the mission information and area location information, as topographic information, and the topographic information is used to generate detailed mission information.

15. The apparatus of claim 11, wherein the program is configured to perform, in transferring to the at least one rotary-wing drone, transferring third mission information including performance of a detailed task, generated based on at least one of the result of analysis of the entire agricultural arable land or a result of precision analysis of the problem region or a combination thereof, to a second rotary-wing drone.

16. The apparatus of claim 9, wherein:

wherein the service information is managed by the data monitoring for systematic management of data acquired from the heterogeneous devices in real time.

\* \* \* \* \*